(12) United States Patent
Wu

(10) Patent No.: US 6,970,978 B1
(45) Date of Patent: Nov. 29, 2005

(54) SYSTEM AND METHOD FOR PROVIDING A PRE-FETCH MEMORY CONTROLLER

(75) Inventor: Stephen W. Wu, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 343 days.

(21) Appl. No.: 10/115,873

(22) Filed: Apr. 3, 2002

(51) Int. Cl.[7] .................................................. G06F 12/00
(52) U.S. Cl. ..................... 711/137; 711/104; 711/105; 711/106; 711/118; 711/154; 711/158; 710/5; 710/22; 710/53; 710/112; 710/240; 710/310; 710/314
(58) Field of Search .......................... 710/52, 53, 310, 710/312, 5, 22–23, 110, 112, 240, 314; 711/137, 711/100, 117–118, 200, 213; 712/206–207, 712/205, 220, 233, 234, 237

(56) References Cited

U.S. PATENT DOCUMENTS

| | | | | |
|---|---|---|---|---|
| 5,432,918 A | * | 7/1995 | Stamm | 711/156 |
| 5,530,941 A | * | 6/1996 | Weisser et al. | 711/151 |
| 5,752,272 A | * | 5/1998 | Tanabe | 711/171 |
| 6,108,741 A | * | 8/2000 | MacLaren et al. | 710/314 |
| 6,138,192 A | * | 10/2000 | Hausauer | 710/100 |
| 6,381,672 B1 | * | 4/2002 | Strongin et al. | 711/105 |
| 6,389,514 B1 | * | 5/2002 | Rokicki | 711/136 |
| 6,502,157 B1 | * | 12/2002 | Batchelor et al. | 710/310 |
| 6,523,093 B1 | * | 2/2003 | Bogin et al. | 711/137 |
| 6,594,730 B1 | * | 7/2003 | Hum et al. | 711/137 |

* cited by examiner

*Primary Examiner*—Donald Sparks
*Assistant Examiner*—Hashem Farrokh
(74) *Attorney, Agent, or Firm*—Toler, Larson & Abel, LLP

(57) ABSTRACT

A system and method is disclosed for providing a pre-fetch memory controller in a computer system that comprises a plurality of master agents. The memory controller comprises a bus interface, a memory interface and a plurality of pre-fetch queues. In one embodiment each pre-fetch queue is assigned to a master agent. In an alternate embodiment the pre-fetch queues are dynamically assigned to master agents. The bus interface services memory read requests, memory write requests, and pre-fetch requests. Data may be pre-fetched from main memory and stored in the pre-fetch queues. This reduces the latency for memory read requests and improves the efficiency of the memory interface with the main memory.

43 Claims, 10 Drawing Sheets

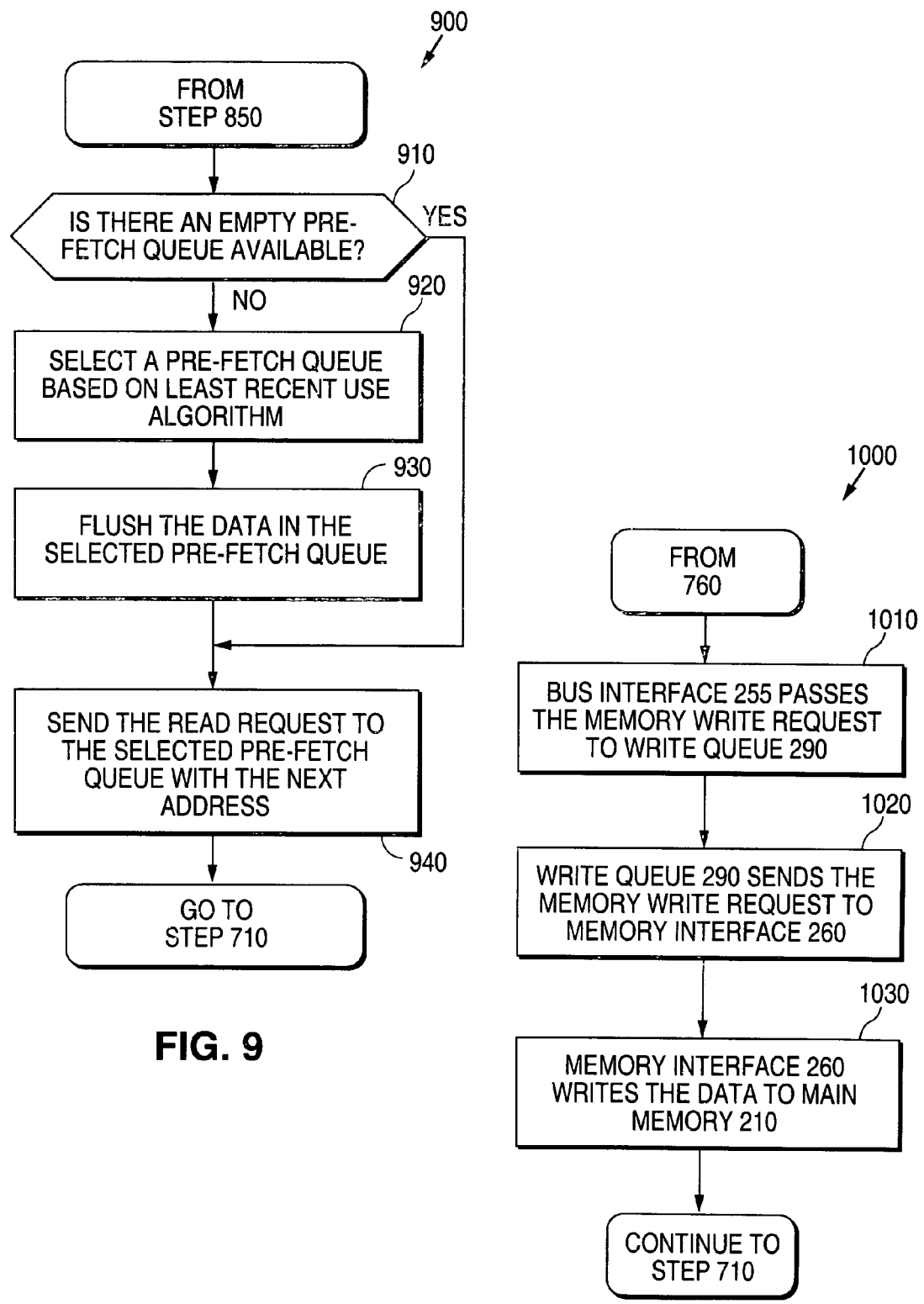

SYSTEM AND METHOD FOR PROVIDING A PRE-FETCH MEMORY CONTROLLER

FIELD OF THE INVENTION

The present invention relates generally to the field of computer technology. The present invention provides an improved system and method for providing a pre-fetch memory controller that enables a bus master to more efficiently access a main memory unit.

BACKGROUND OF THE INVENTION

It is common practice to use a bus master to move data from a master agent to main memory and to move data from a main memory to a master agent. A computer system that comprises a plurality of master agents may use a plurality of bus masters. In some cases, there can be one bus master for each master agent.

One of the most popular memory devices in use today is Dynamic Random Access Memory (DRAM). The latency for reading a desired item of data from DRAM memory depends upon how many DRAM banks (or DRAM pages) are presently open. The condition that exists when a desired item of data is located in an opened DRAM bank is referred to as a "Page Hit." The latency for a "Page Hit" is approximately two (2) or three (3) DRAM clock cycles.

The condition that exists when a desired item of data is not located in an opened DRAM bank is referred to as a "Page Miss." The latency for a "Page Miss" is much higher than the latency for a "Page Hit." This is because the DRAM controller has to close one of the presently opened DRAM banks, open the desired DRAM bank, and then read the data from the newly opened DRAM bank.

In a multiple-master computer system, the individual bus masters access the DRAM memory concurrently. That is, the requests from the bus masters that are sent to the individual DRAM banks are interlaced. This causes the "Page Hit" rate and the DRAM interface throughput to be significantly reduced. Therefore in a multi-master computer system the bandwidth of the main memory interface (e.g., DRAM controller) becomes the performance bottleneck of the system.

It would be desirable to have a multi-master computer system that enables bus masters to access main memory in a more efficient manner.

It would be desirable to have a multi-master computer system that reduces the latency required for a bus master to access main memory.

It would be desirable to have a multi-master computer system that increases the throughput of the main memory interface.

SUMMARY OF THE INVENTION

The present invention is directed to an apparatus and method for providing an improved pre-fetch memory controller in a computer system.

In one advantageous embodiment of the present invention, the pre-fetch memory controller pre-fetches data from a DRAM bank of the main memory only when so requested by a master agent. Pre-fetching data in response to a master agent request is an efficient method because only the master agent knows if it needs the next portion of data. Pre-fetching data in response to a master agent request conserves the bandwidth of the main memory interface. This is because no bandwidth is wasted on unnecessary pre-fetch requests.

The pre-fetch memory controller of the present invention comprises a plurality of pre-fetch queues. In one advantageous embodiment of the invention each master agent is assigned its own pre-fetch queue. The condition that exists when a desired item of data is located in a pre-fetch queue is referred to as a "Pre-Fetch Queue Hit" (sometimes abbreviated PFQH). Assigning a pre-fetch queue to each master agent improves the rate of occurrence of Pre-Fetch Queue Hits. When Memory Read transactions are interlaced, the data stored within the pre-fetch queues is not discarded very often.

When a desired item of data is located in a pre-fetch queue, the pre-fetch queue provides the desired item of data to the appropriate bus master. There is then no need for a memory transaction to go through the main memory interface. This improves the Memory Read latency and reduces the main memory bandwidth requirement.

A Memory Read request, a Memory Write request, and several Pre-Fetch requests may exist at the same time in the pre-fetch memory controller. The pre-fetch memory controller is capable of servicing the various requests based on the priority of the requests. Pre-Fetch requests have a lower priority than the Memory Read request and the Memory Write request. Therefore the Pre-Fetch requests are serviced when there are no other memory transactions for the main memory interface. This increases the throughput for the main memory interface.

In an alternate advantageous embodiment of the invention, the pre-fetch queues in the pre-fetch memory controller are dynamically assigned to the master agents of the computer system.

It is an object of the present invention to provide an improved pre-fetch memory controller comprising a plurality of pre-fetch queues.

It is another object of the present invention to provide an improved pre-fetch memory controller in which each pre-fetch queue in the pre-fetch memory controller is assigned to a master agent of a computer system.

It is another object of the present invention to provide an alternate embodiment of an improved pre-fetch memory controller in which the pre-fetch queues in the pre-fetch memory controller are dynamically assigned to a plurality of master agents of a computer system.

It is another object of the present invention to provide an improved pre-fetch memory controller that enables bus masters to efficiently access a main memory.

It is also an object of the present invention to provide an improved pre-fetch memory controller that reduces the latency for memory read requests.

It is another object of the present invention to provide an improved pre-fetch memory controller that improves the efficiency of a memory interface with a main memory.

The foregoing has outlined rather broadly the features and technical advantages of the present invention so that those skilled in the art may better understand the Detailed Description of the Invention that follows. Additional features and advantages of the invention will be described hereinafter that form the subject matter of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, to bound to or with, have, have a property of, or the like; and the term "controller," "processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill should understand that in many instances (if not in most instances), such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which:

FIG. 9 illustrates a third portion of a flow chart of an alternate advantageous embodiment of a method of the present invention;

FIG. 10 illustrates a fourth portion of a flow chart of an alternate advantageous embodiment of a method of the present invention;

DETAILED DESCRIPTION OF THE INVENTION

FIGS. 1 through 12, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged multi-master computer system.

Figure 1:
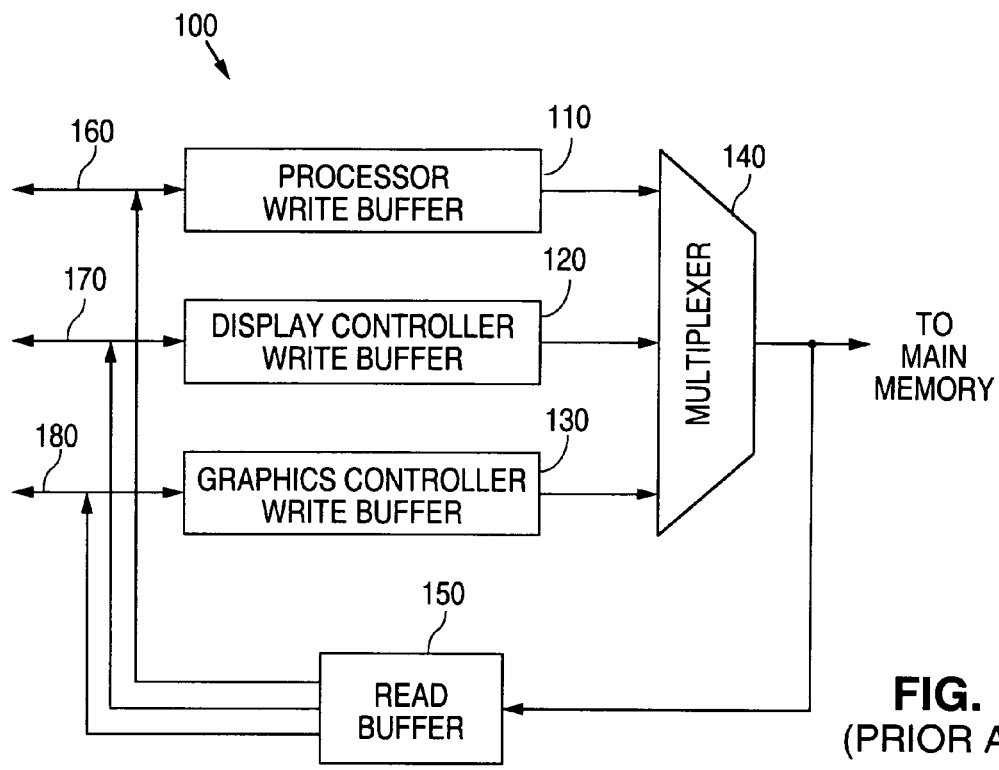
FIG. 1 illustrates a portion of a prior art memory controller.

FIG. 1 illustrates a block diagram of a portion of a prior art memory controller 100. The illustrated portion of memory controller 100 comprises a processor write buffer 110, a display controller write buffer 120, and a graphics controller write buffer 130, all of which have an output coupled to an input of multiplexer 140. Multiplexer 140 multiplexes Memory Write transactions from buffers 110, 120 and 130 to the main memory (not shown).

An input of read buffer 150 is also coupled to the main memory. Read buffer 150 receives data from the main memory. A first output of read buffer 150 is coupled to data signal line 160 that is coupled to processor write buffer 110. A second output of read buffer 150 is coupled to data signal line 170 that is coupled to display controller write buffer 120. A third output of read buffer 150 is coupled to data signal line 180 that is coupled to graphics controller write buffer 130.

Read buffer 150 multiplexes Memory Read transactions from the main memory to each of the master agents (not shown) for the processor (not shown), and for the display controller (not shown), and for the graphics controller (not shown).

Prior art memory controller 100 is an example of a memory controller that services three master agents. Memory controller 100 contains only one read buffer (read buffer 150). Read buffer 150 is shared by all three master agents.

Figure 2:
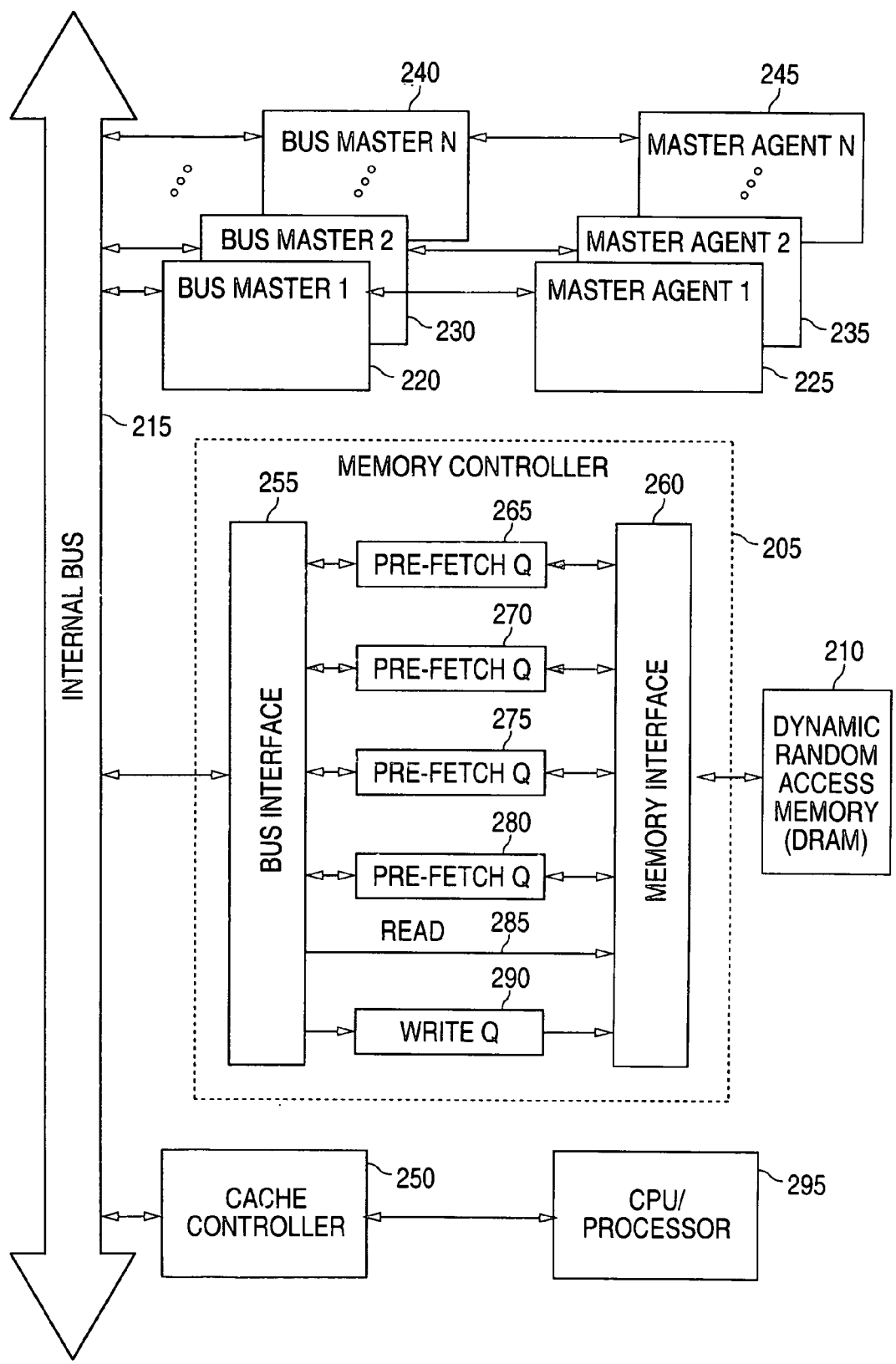
FIG. 2 illustrates a block diagram of an advantageous embodiment of a pre-fetch memory controller of the present invention.

FIG. 2 illustrates a block diagram of an advantageous embodiment of a pre-fetch memory controller 205 of the present invention. Pre-fetch memory controller 205 is coupled to main memory 210. In the embodiment shown in FIG. 2 main memory 210 comprises Dynamic Random Access Memory (DRAM). Other types of memory may be used in main memory 210 instead of DRAM. Pre-fetch memory controller 205 is also coupled to internal bus 215.

As shown in FIG. 2, bus master 220 (Bus Master 1) is coupled to internal bus 215 and to master agent 225 (Master Agent 1). Bus master 230 (Bus Master 2) is coupled to internal bus 215 and to master agent 235 (Master Agent 2). Additional bus masters and master agents may be coupled to internal bus 215. The additional bus masters and master agents are represented by bus master 240 (Bus Master N) and master agent 245 (Master Agent N). As shown in FIG. 2, bus master 240 (Bus Master N) is coupled to internal bus 215 and to master agent 245 (Master Agent N). Lastly, central processing unit (CPU)/processor 295 is coupled to internal bus 215 through cache controller 250.

Pre-fetch memory controller 205 comprises bus interface 255, memory interface 260, pre-fetch queue 265, pre-fetch queue 270, pre-fetch queue 275, pre-fetch queue 280, read line 285 and write queue 290. Pre-fetch memory controller 205 may also comprise other memory controller circuitry (not shown) that is not pertinent to the present invention.

Pre-fetch memory controller 205 is capable of serving a plurality of bus masters, 220 to 240. In one advantageous embodiment of the invention, each bus master is assigned to its own pre-fetch queue in pre-fetch memory controller 205. In an alternate advantageous embodiment of the invention (in which there are more bus masters than pre-fetch queues), the pre-fetch queues in pre-fetch memory controller 205 are dynamically assigned to the bus masters.

In an exemplary embodiment of the present invention pre-fetch memory controller 205 has four (4) pre-fetch queues, 265 to 280. Therefore, in the advantageous embodiment of the invention in which each bus master is assigned to its own pre-fetch queue in pre-fetch memory controller 205, pre-fetch memory controller 205 is capable of servicing four (4) bus masters. The number four (4) is merely an example. It is understood that the invention is not limited to the use of four pre-fetch queues. It is understood that pre-fetch memory controller 205 may comprise more than four pre-fetch queues or fewer than four pre-fetch queues.

The bus masters (i.e., bus master 220 through bus master 240) generate memory transactions and send the memory transactions to pre-fetch memory controller 205 through internal bus 215. An individual bus master (e.g., bus master 220) specifies the memory size when it generates a memory transaction. The memory size can be from one byte up to one full cache line.

Bus master 220 knows the buffer size in main memory 210. When bus master 220 wants to read data from main memory 210 and the remaining buffer size is greater than a cache line, bus master 220 knows that more than one Memory Read transaction will be needed. Bus master 220 generates a Memory Read request with the memory size equal to a cache line and sets a Pre-Fetch Flag. The Pre-Fetch Flag is part of the command field in the Memory Read request.

Bus Interface 255 in pre-fetch memory controller 205 receives the Memory Read requests and the Memory Write requests from internal bus 215. When bus interface 255 receives a Memory Write request, bus interface 255 receives the data, places the data into write queue 290, and completes the Memory Write transaction.

When bus interface 255 receives a Memory Read request, bus interface 255 checks whether the required data is presently located in one of the pre-fetch queues, 265 to 280. If the required data is available in one of the pre-fetch queues, 265 to 280, the "data available" condition is referred to as a "Pre-Fetch Queue Hit" (PFQH). Bus interface 255 receives the data to service the Memory Read request from the pre-fetch queue that holds the data and finishes the Memory Read transaction. In this case main memory 210 will not be aware of the Memory Read request.

If the required data is not available in one of the pre-fetch queues, 265 to 280, the "data not available" condition is referred to as a "Pre-Fetch Queue Miss" (PFQM). Then bus interface 255 passes the request to memory interface 260 through read line 285 and waits for memory interface 260 to retrieve the required data from main memory 210.

When bus interface 255 is servicing a Memory Read request, bus interface 255 also checks the Pre-Fetch Flag. If the Pre-Fetch Flag is cleared, then no further action is needed. However, if the Pre-Fetch Flag is set, bus interface 255 passes the Memory Read request to an appropriate pre-fetch queue as a Pre-Fetch request in addition to servicing the current Memory Read request.

When a pre-fetch queue gets a Pre-Fetch request from bus interface 255, it passes the Pre-Fetch request to memory interface 260 and waits for memory interface 260 to service to Pre-Fetch request. Memory interface 260 then accesses main memory 210 to obtain the data. Memory interface 260 then sends the requested data to the pre-fetch queue that requested the data. The pre-fetch queue then stores the requested data in an internal First In First Out (FIFO) buffer (not shown) and waits for bus interface 255 to retrieve the data.

When bus interface 255 detects a Pre-Fetch Queue Hit (PFQH) condition, bus interface 255 retrieves the data stored in the appropriate pre-fetch queue through a Memory Read request.

Memory interface 260 receives memory requests from bus interface 255 (through read line 285), from write queue 290, and from the pre-fetch queues, 265 to 280. Memory interface 260 arbitrates the memory requests based on the request types (i.e., Memory Read request, Memory Write request, or Pre-Fetch request), and based on the memory banks that are open in main memory 210. Memory interface 260 services the request that wins the arbitration and performs the memory transactions with main memory 210.

All Memory Write requests are posted. When bus interface 255 receives a Memory Write request, bus interface 255 passes the Memory Write request to write queue 290. Write queue 290 stores the Memory Write request data in an internal First In First Out (FIFO) buffer (not shown). Write queue 290 sends the Memory Write request to memory interface 260. Memory interface 260 accesses main memory 210 and writes the data to main memory 210.

Cache controller 250 is also coupled to internal bus 215. Cache controller 250 monitors all of the memory transactions on internal bus 215. When a cache line write back is required, cache controller 250 stalls the current Memory Read transaction and writes back the cache line to main memory 210.

Because pre-fetch memory controller 205 contains more than one pre-fetch queue, a selection algorithm is needed to select an appropriate pre-fetch queue. When bus interface 255 receives a Memory Read request with the Pre-Fetch Flag set, bus interface 255 selects a pre-fetch queue based on the following algorithm.

Step 1. If the current Memory Read request requests data that is located in one of the pre-fetch queues (i.e., a "Pre-Fetch Queue Hit"), then bus interface 255 selects that pre-fetch queue.

Step 2. If none of the pre-fetch queues contain the requested data, then bus interface 255 selects an empty pre-fetch queue.

Step 3. If there are no empty pre-fetch queues, bus interface 255 uses a "Least Recent Use" (LRU) algorithm to select a pre-fetch queue. The LRU algorithm selects the pre-fetch queue that has gone the longest time without being accessed. Step 4. Discard the data that is in the selected pre-fetch queue.

When bus interface 255 receives a Memory Read request and the requested data is in write queue 290, then bus interface 255 stalls the Memory Read request until write queue 290 writes out the data to memory interface 260 and to main memory 210.

When bus interface 255 receives a Memory Write request and the data to be written is located in one or more of the pre-fetch queues, bus interface 255 discards the data in those pre-fetch queues.

When bus interface 255 receives a Memory Read request that is the same as a pending Pre-Fetch request, then bus interface 255 sends the Memory Read request to memory interface 260 and cancels the pending Pre-Fetch request.

Prior art memory controllers have only one read buffer (i.e., only one pre-fetch queue) because a prior art memory controller has no way to track different requests from different bus masters. Pre-fetch memory controller 205 of the present invention uses information from a Pre-Fetch Flag and from a memory address to track memory requests from different bus masters. This permits each bus master to effectively have access to a separate pre-fetch queue read buffer.

Figure 3:
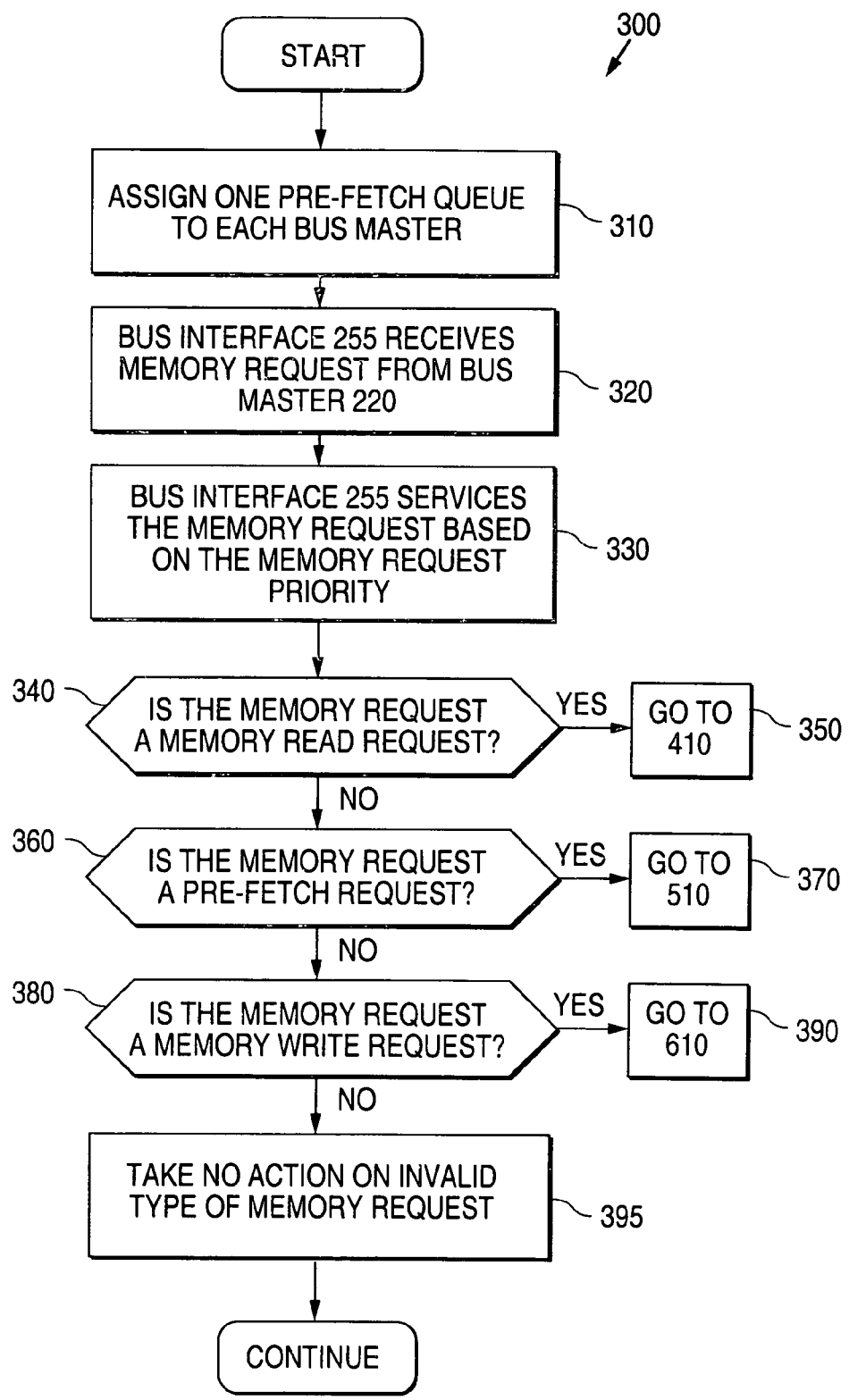
FIG. 3 illustrates a first portion of a flow chart of an advantageous embodiment of a method of the present invention.

FIG. 3 illustrates a first portion of a flow chart of an advantageous embodiment of a method of the present invention for providing a pre-fetch memory controller. The steps of the method shown in FIG. 3 are generally denoted with reference numeral 300.

In this embodiment of the invention (where the number of pre-fetch queues is greater than or equal to the number of bus masters), pre-fetch memory controller 205 assigns one pre-fetch queue to each bus master (step 310). In an illustrative example bus master 220 receives a memory request from master agent 225 and sends the memory request to bus interface 255 (step 320). Bus interface 255 services the memory request based on the priority of the memory request (step 330).

Bus interface 255 determines whether the memory request is a Memory Read request (decision step 340). If the memory request is a Memory Read request then control passes to step 410 and the Memory Read request is processed (step 350).

If the memory request is not a Memory Read request then bus interface 255 determines whether the memory request is a Pre-Fetch request (decision step 360). If the memory request is a Pre-Fetch request then control passes to step 510 and the Pre-Fetch request is processed (step 370). If the memory request is not a Pre-Fetch request then bus interface 255 determines whether the memory request is a Memory Write request (decision step 380). If the memory request is a Memory Write request then control passes to step 610 and the Memory Write request is processed (step 390).

A valid memory request must be a Memory Read request, a Pre-Fetch request, or a Memory Write request. If bus interface 255 determines in decision step 380 that the memory request is not a Memory Write request, then the memory request is not a valid request because it is neither a Memory Read request, nor a Pre-Fetch request, nor a Memory Write request. No action is taken on an invalid type of memory request (step 395). Pre-fetch memory controller 205 continues to process other memory requests.

Figure 4:
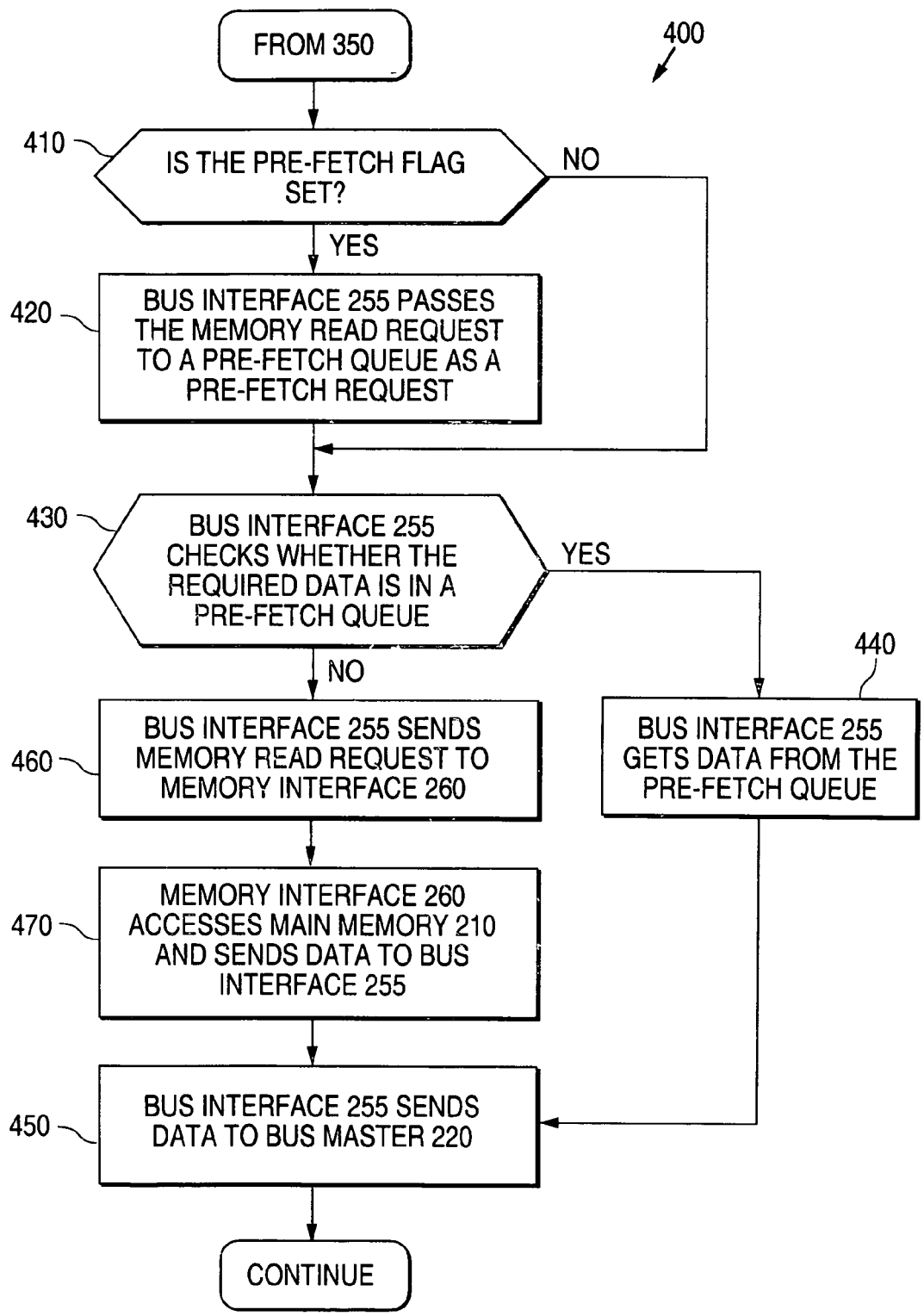
FIG. 4 illustrates a second portion of a flow chart of an advantageous embodiment of a method of the present invention.

FIG. 4 illustrates a second portion of a flow chart of an advantageous embodiment of a method of the present invention for providing a pre-fetch memory controller. The steps of the method shown in FIG. 4 are generally denoted with reference numeral 400.

Control passes from step 350 indicating that bus interface 255 has identified a Memory Read request. Bus interface 255 determines whether the Pre-Fetch Flag has been set (decision step 410). If the Pre-Fetch Flag has not been set, then no action is taken and control passes to step 430. If the Pre-Fetch Flag has been set, then bus interface 255 passes the Memory Read request to a pre-fetch queue as a Pre-Fetch request (step 420).

Bus interface 255 then determines whether the required data is located in a pre-fetch queue (decision step 430). If the required data is located in a pre-fetch queue, then bus interface 255 gets the data from the pre-fetch queue in which the data is located (step 440). Bus interface 255 then sends the data to bus master 220 (step 450).

If bus interface 255 determines in step 430 that the required data is not located in a pre-fetch queue, then bus interface 255 sends the Memory Read request to memory interface 260 (step 460). Memory interface 260 accesses main memory 210 to read the data and then sends the data to bus interface 255 (step 470). Bus interface 255 then sends the data to bus master 220 (step 450). Pre-fetch memory controller 205 continues to process other memory requests.

Figure 5:
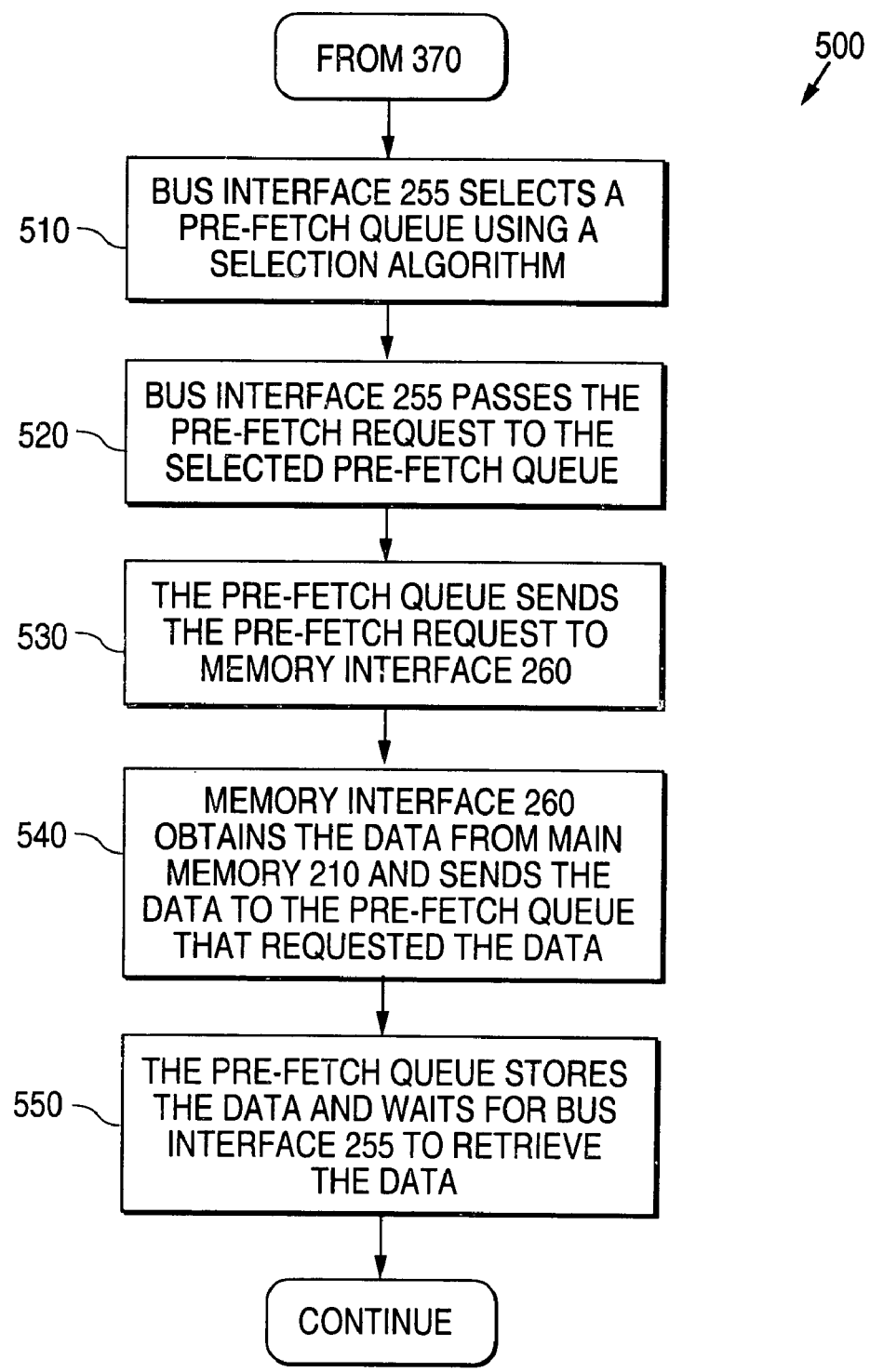
FIG. 5 illustrates a third portion of a flow chart of an advantageous embodiment of a method of the present invention.

FIG. 5 illustrates a third portion of a flow chart of an advantageous embodiment of a method of the present invention for providing a pre-fetch memory controller. The steps of the method shown in FIG. 5 are generally denoted with reference numeral 500.

Control passes from step 370 indicating that bus interface 255 has identified a Pre-Fetch request. Bus interface 255 selects a pre-fetch queue using a selection algorithm (step 510). Bus interface 255 then passes the Pre-Fetch request to the selected pre-fetch queue (step 520). Then the selected pre-fetch queue sends the Pre-Fetch request to memory interface 260 (step 530).

Memory interface 260 obtains the data from main memory 210 and sends the data to the pre-fetch queue that requested the data (step 540). The pre-fetch queue stores the data and waits for bus interface 255 to retrieve the data (step 550). Pre-fetch memory controller 205 continues to process other memory requests.

Figure 6:
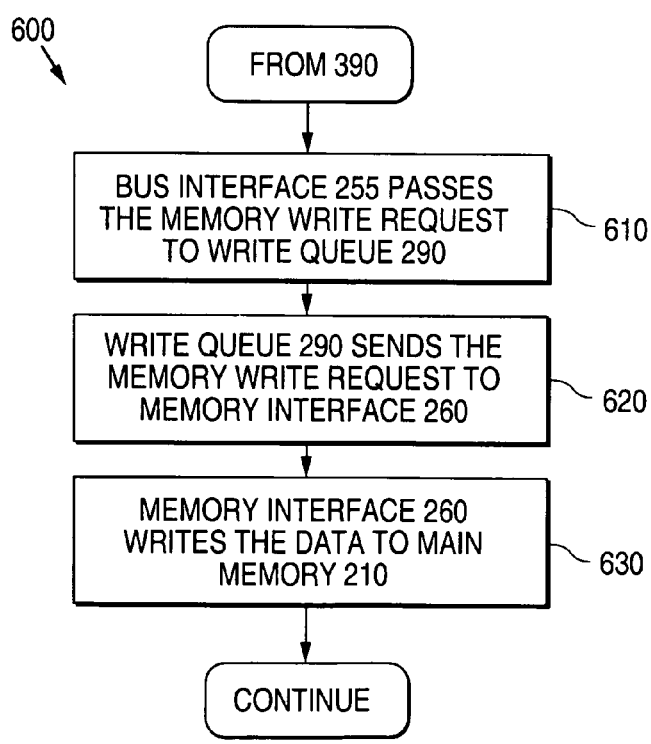
FIG. 6 illustrates a fourth portion of a flow chart of an advantageous embodiment of a method of the present invention.

FIG. 6 illustrates a fourth portion of a flow chart of an advantageous embodiment of a method of the present invention for providing a pre-fetch memory controller. The steps of the method shown in FIG. 6 are generally denoted with reference numeral 600.

Control passes from step 390 indicating that bus interface 255 has identified a Memory Write request. Bus interface 255 passes the Memory Write request to write queue 290 (step 610). Write queue 290 sends the Memory Write request to memory interface 260 (step 620). Memory interface 260 writes the data to main memory 210 (step 630). Pre-fetch memory controller 205 continues to process other memory requests.

In some applications the pre-fetch queues in pre-fetch memory controller 205 may be fewer in number than the bus masters in the system. For example, the designer of pre-fetch memory controller 205 may decide to implement fewer pre-fetch queues in order to reduce costs. Alternatively, pre-fetch memory controller 205 may be employed in a system that is capable of being expanded. When new circuit cards are added to the system, the number of bus masters may exceed the number of pre-fetch queues in pre-fetch memory controller 205.

In another instance, a single bus master may be connected to more than one "direct memory access" (DMA) engine. For example, (1) an audio controller may use different DMA engines for different audio channels, and (2) a SCSI controller may be controlling two or three hard disk drives. In these (and similar) applications different DMA engines usually access different locations in memory.

An alternate embodiment of pre-fetch memory controller 205 is capable of handling these types of situations. As will be more fully described, in the alternate embodiment the pre-fetch queues in pre-fetch memory controller 205 are dynamically assigned to the master agents.

In the alternate embodiment of the invention (where the number of pre-fetch queues is less than the number of bus masters (or master agents)), the assignment of the pre-fetch queues is based on the activities of the bus masters. After "power on reset" all the pre-fetch queues are empty and are not assigned to any bus master. After the bus masters start to read data from main memory 210, the pre-fetch queues will be assigned in the manner that will be described with reference to FIG. 9 below.

Figure 7:
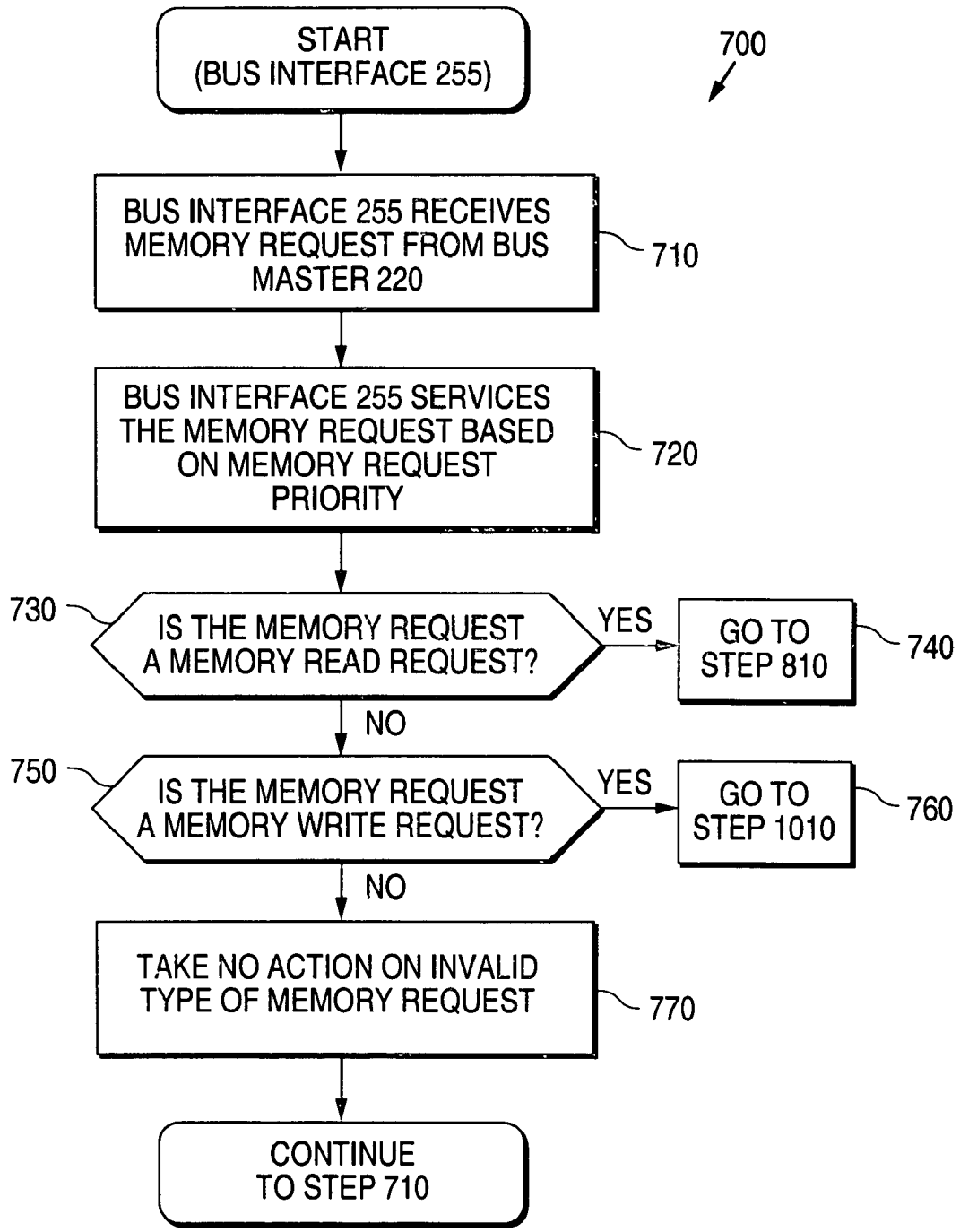
FIG. 7 illustrates a first portion of a flow chart of an alternate advantageous embodiment of a method of the present invention.

FIG. 7 illustrates a first portion of a flow chart of an alternate advantageous embodiment of a method of the present invention for providing a pre-fetch memory controller. The steps of the method shown in FIG. 7 are generally denoted with reference numeral 700. The steps of the method shown in FIG. 7 are carried out by bus interface 255.

Bus interface 255 receives a memory request from bus master 220 (step 710). Bus interface 255 services the memory request based on the priority of the memory request (step 720).

Bus interface 255 determines whether the memory request is a Memory Read request (decision step 730). If the memory request is a Memory Read request then control passes to step 810 and the Memory Read request is processed (step 740).

If the memory request is not a Memory Read request then bus interface 255 determines whether the memory request is a Memory Write request (decision step 750). If the memory request is a Memory Write request then control passes to step 1010 and the Memory Write request is processed (step 760).

A valid memory request must be either a Memory Read request or a Memory Write request. If bus interface 255 determines in decision step 750 that the memory request is not a Memory Write request, then the memory request is not a valid request because it is neither a Memory Read request nor a Memory Write request. No action is taken on an invalid type of memory request (step 770). Pre-fetch memory controller 205 continues to step 710 to process other memory requests.

Figure 8:
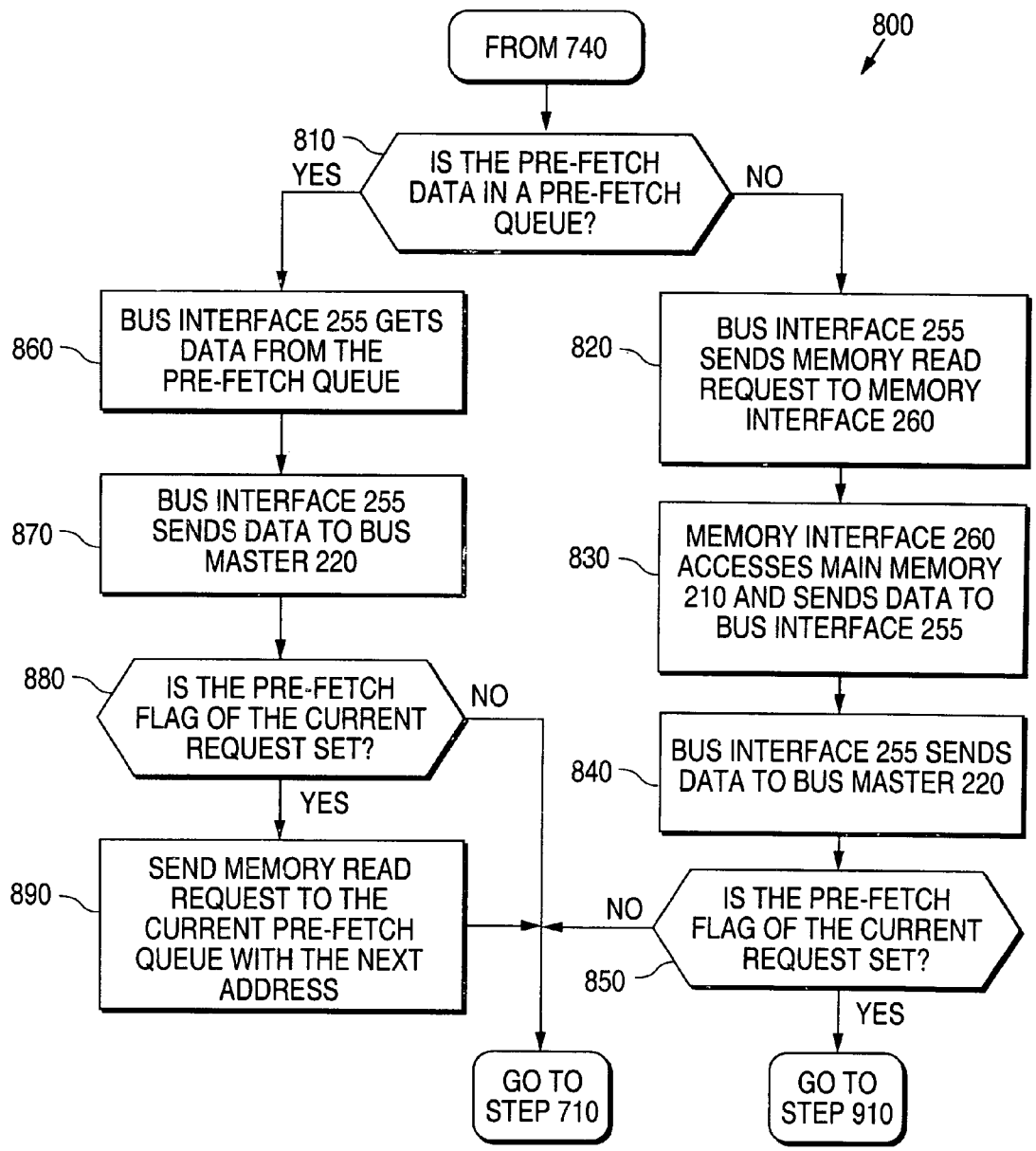
FIG. 8 illustrates a second portion of a flow chart of an alternate advantageous embodiment of a method of the present invention.

FIG. 8 illustrates a second portion of a flow chart of an alternate advantageous embodiment of a method of the present invention for providing a pre-fetch memory controller. The steps of the method shown in FIG. 8 are generally denoted with reference numeral 800.

Control passes from step 740 indicating that bus interface 255 has identified a Memory Read request. Bus interface 255 determines whether the required data is located in a pre-fetch queue (decision step 810). If the required data is located in a pre-fetch queue, then bus interface 255 gets the data from the pre-fetch queue in which the data is located (step 860). Bus interface 255 then sends the data to bus master 220 (step 870).

Bus interface 255 then determines if the Pre-Fetch Flag of the current request is set (decision step 880). If the Pre-Fetch Flag is not set, then bus interface 255 continues to step 710 to process other memory requests. If the Pre-Fetch Flag is set, then bus interface 255 sends the Memory Read request to the current pre-fetch queue with the next address (step 890). Then bus interface 255 continues to step 710 to process other memory requests.

If bus interface 255 determines in step 810 that the required data is not located in a pre-fetch queue, then bus interface 255 sends the Memory Read request to memory interface 260 (step 820). Memory interface 260 accesses main memory 210 to read the data and then sends the data to bus interface 255 (step 830). Bus interface 255 then sends the data to bus master 220 (step 840).

Bus interface 255 then determines if the Pre-Fetch Flag of the current request is set (decision step 850). If the Pre-Fetch Flag is not set, then bus interface 255 continues to step 710 to process other memory requests. If the Pre-Fetch Flag is set, then bus interface 255 sends the Memory Read request to step 910 (shown in FIG. 9) to select a pre-fetch queue.

FIG. 9 illustrates a third portion of a flow chart of an alternate advantageous embodiment of a method of the present invention for providing a pre-fetch memory controller. The steps of the method shown in FIG. 9 are generally denoted with reference numeral 900.

Control passes to step 910 from step 850. Bus interface 255 determines whether there is an empty pre-fetch queue available (decision step 910). If there is an empty pre-fetch queue available, bus interface 255 then sends the Memory Read request to the empty pre-fetch queue with the next address (step 940). Then bus interface 255 continues to step 710 to process other memory requests.

If there is no empty pre-fetch queue available, then bus interface selects a pre-fetch queue based on a "Least Recent Use" (LRU) algorithm (step 920). Bus interface 255 then flushes the data from the selected pre-fetch queue (step 930). Bus interface 255 then sends the Memory Read request to the selected pre-fetch queue with the next address (step 940). Then bus interface 255 continues to step 710 to process other memory requests.

FIG. 10 illustrates a fourth portion of a flow chart of an alternate advantageous embodiment of a method of the present invention for providing a pre-fetch memory controller. The steps of the method shown in FIG. 10 are generally denoted with reference numeral 1000.

Control passes from step 760 indicating that bus interface 255 has identified a Memory Write request. Bus interface 255 passes the Memory Write request to write queue 290 (step 1010). Write queue 290 sends the Memory Write request to memory interface 260 (step 1020). Memory interface 260 writes the data to main memory 210 (step 1030). Pre-fetch memory controller 205 continues to step 710 to process other memory requests.

Figure 11:
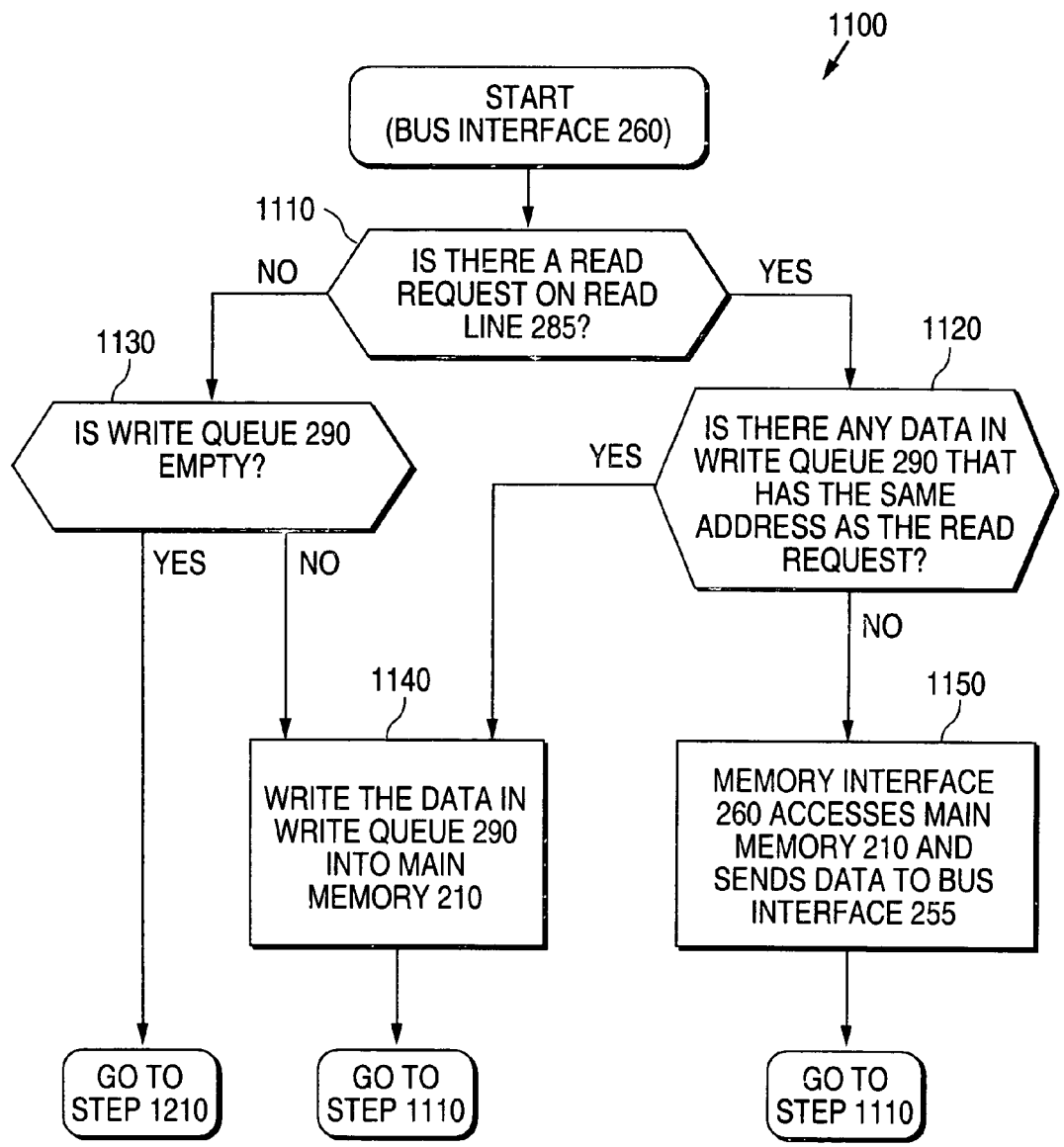
FIG. 11 illustrates a fifth portion of a flow chart of an alternate advantageous embodiment of a method of the present invention.

FIG. 11 illustrates a fifth portion of a flow chart of an alternate advantageous embodiment of a method of the present invention. The steps of the method shown in FIG. 11 are generally denoted with reference numeral 1100. The steps of the method shown in FIG. 11 are carried out by memory interface 260.

Memory interface 260 determines whether there is a Memory Read request on read line 285 (decision step 1110). If there is a Memory Read request on read line 285, then memory interface 260 determines whether there is any data in write queue 290 that has the same address as the Memory Read request (decision step 1120). If memory interface 260 determines that there is no data in write queue 290 that has the same address as the Memory Read request, then memory interface 260 accesses main memory 210 and sends the data to bus interface 255 (step 1150). Memory interface 260 then continues to step 1110 to process other memory requests.

If memory interface 260 does determine in decision step 1120 that there is data in write queue 290 that has the same address as the Memory Read request, then memory interface 260 writes the data that is write queue 290 into main memory 210 (step 1140). Memory interface 260 then continues to step 1110 to process other memory requests.

If memory interface 260 determines in decision step 1110 that there is no Memory Read request on read line 285, then memory interface 260 determines whether write queue 290 is empty (decision step 1130). If write queue 290 is not empty, then memory interface 260 writes the data that is write queue 290 into main memory 210 (step 1140). Memory interface 260 then continues to step 1110 to process other memory requests.

Figure 12:
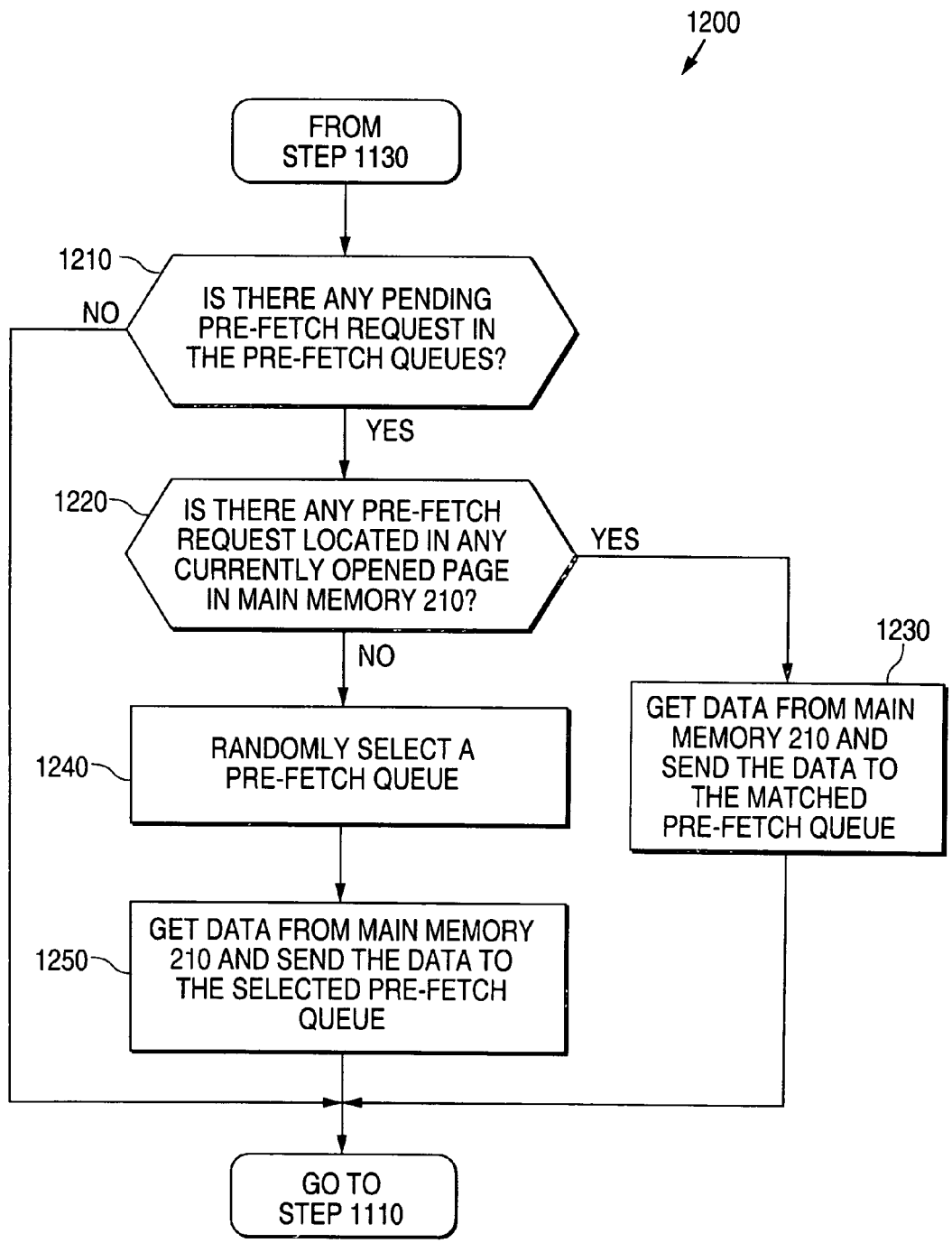
FIG. 12 illustrates a sixth portion of a flow chart of an alternate advantageous embodiment of a method of the present invention.

If memory interface 260 determines in decision step 1130 that write queue 290 is empty, then control passes to step 1210 (shown in FIG. 12).

FIG. 12 illustrates a sixth portion of a flow chart of an alternate advantageous embodiment of a method of the present invention. The steps of the method shown in FIG. 12 are generally denoted with reference numeral 1200. The steps of the method shown in FIG. 12 are carried out by memory interface 260.

Control passes from step 1130. Memory interface 260 then determines whether there is any pending pre-fetch request in the pre-fetch queues (i.e., pre-fetch queues 265, 270, 275 and 280) (decision step 1210). If there is no pending pre-fetch request in the pre-fetch queues, then memory interface 260 continues to step 1110 to process other memory requests.

If memory interface 260 determines in decision step 1210 that there is a pending pre-fetch request, then memory interface 260 determines whether there is any pre-fetch request located in any currently opened page of main memory 210 (decision step 1220). If there is a pending pre-fetch request in a currently opened page of main memory 210, then memory interface 260 gets the data from main memory 210 and sends the data to the matched pre-fetch queue (step 1230). Memory interface 260 then continues to step 1110 to process other memory requests.

If memory interface 260 determines in decision step 1220 that there is no pre-fetch request located in a currently opened page of main memory 210, then memory interface 260 randomly selects a pre-fetch queue (step 1240). Memory interface 260 then gets data from main memory 210 and sends the data to the pre-fetch queue randomly selected in step 1240 (step 1250). Memory interface 260 then continues to step 1110 to process other memory requests.

As described above, pre-fetch memory controller 205 of the present invention comprises a plurality of pre-fetch queues, 265 to 280. Pre-fetch memory controller 205 works with a plurality of master agents, 225 to 245, to reduce the latency for Memory Read requests and to improve interface utilization with main memory 210. The approach of the present invention significantly improves the system performance of a memory controller in a computer system that comprises a plurality of master agents.

The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. For use in a computer system comprising a plurality of master agents, a memory controller comprising:
   a bus interface capable of being coupled to an internal bus of said computer system;
   a memory interface capable of being coupled to a main memory of said computer system; and
   a plurality of pre-fetch queues, wherein each pre-fetch queue is coupled to said bus interface to receive data from said bus interface, and wherein each pre-fetch queue is coupled to said memory interface to send data to said memory interface;
   wherein said bus interface, upon identifying a pre-fetch request, is further capable of selecting a pre-fetch queue of said plurality of pre-fetch queues using a selection algorithm; and
   wherein said bus interface is capable of sending said pre-fetch request to the selected pre-fetch queue.

2. A memory controller as claimed in claim 1 wherein each of said plurality of pre-fetch queues is assigned to a corresponding master agent of said plurality of master agents of said computer system.

3. A memory controller as claimed in claim 1 further comprising:
   a write queue coupled to said bus interface and to said memory interface; and
   a read line coupled to said bus interface and to said memory interface.

4. A memory controller as claimed in claim 3 wherein said bus interface is capable of receiving through said internal bus a memory request from a bus master associated with a master agent; and
   wherein said bus interface is capable of determining whether said memory request is one of: a memory read request, a memory write request, or a pre-fetch request.

5. A memory controller as claimed in claim 4 wherein said bus interface, upon identifying a memory read request, is capable of determining if a pre-fetch flag is set in said memory read request, and in response to determining that said pre-fetch flag is set, is capable of sending said memory read request to a pre-fetch queue as a pre-fetch request.

6. A memory controller as claimed in claim 4 wherein said bus interface, upon identifying a memory read request, is capable of determining whether data requested by said memory read request is located in a pre-fetch queue of said plurality of pre-fetch queues, and in response to determining that said requested data is located in said pre-fetch queue, is capable of retrieving said requested data from said pre-fetch queue.

7. A memory controller as claimed in claim 6 wherein said bus interface, in response to determining that said requested data is not located in said pre-fetch queue, is capable of sending said memory read request to said memory interface; and
   wherein said memory interface is capable of retrieving said requested data from said main memory.

8. A memory controller as claimed in claim 1 wherein said selected pre-fetch queue is capable of sending said pre-fetch request to said memory interface;
   wherein said memory interface is capable of retrieving from said main memory data requested by said pre-fetch request; and
   wherein said memory interface is capable of sending said data to said selected pre-fetch queue that requested said data.

9. A memory controller as claimed in claim 1 wherein said selection algorithm comprises:
   selecting a pre-fetch queue that contains requested data from said plurality of pre-fetch queues;
   selecting an empty pre-fetch queue if none of said plurality of pre-fetch queues contains said requested data;
   selecting a pre-fetch queue that has gone the longest time without being accessed if there are no empty pre-fetch queues; and
   discarding data from a pre-fetch queue that is selected.

10. A memory controller as claimed in claim 1 wherein one of said plurality of pre-fetch queues is dynamically assigned to one of a plurality of master agents of said computer system when a number of master agents of said computer system is greater than a number of pre-fetch queues in said memory controller.

11. A memory controller as claimed in claim 10 further comprising:
   a write queue coupled to said bus interface and to said memory interface; and
   a read line coupled to said bus interface and to said memory interface.

12. A memory controller as claimed in claim 11 wherein said bus interface is capable of receiving through said internal bus a memory request from a bus master associated with a master agent; and wherein said bus interface is capable of determining whether said memory request is one of: a memory read request or a memory write request.

13. A memory controller as claimed in claim 12 wherein said bus interface, upon identifying a memory read request, is capable of determining if whether data requested by said memory read request is located in a pre-fetch queue of said plurality of pre-fetch queues, and in response to determining that said requested data is located in said pre-fetch queue, is capable of retrieving said requested data from said pre-fetch queue.

14. A memory controller as claimed in claim 13 wherein said bus interface, in response to determining that said requested data is not located in said pre-fetch queue, is capable of sending said memory read request to said memory interface; and wherein said memory interface is capable of retrieving said requested data from said main memory.

15. A memory controller as claimed in claim 12 wherein said bus interface is capable of determining if a pre-fetch flag of a current memory read request is set, and in response to determining that said pre-fetch flag is set, is capable of sending said current memory read request to a current pre-fetch queue with a next address.

16. A memory controller as claimed in claim 14 wherein said bus interface is capable of determining if a pre-fetch flag of a current memory read request is set, and wherein said bus interface is capable of sending to said pre-fetch queue selected by said selection algorithm said current memory read request with a next address.

17. A memory controller as claimed in claim 12 wherein said memory interface in response to determining that there is a memory read request on said read line, is capable of determining whether there is data in said write queue that has a same address as said memory read request.

18. A memory controller as claimed in claim 17 wherein said memory interface in response to determining that there is data in said write queue that has a same address as said memory read request, is capable of writing said data in said write queue to said main memory, and wherein said memory interface in response to determining that there is no data in said write queue that has a same address as said memory read request, is capable of accessing said main memory to obtain data to complete said memory read request.

19. A memory controller as claimed in claim 12 wherein said memory interface in response to determining that there is no memory read request on said read line, is capable of determining whether said write queue is empty; and wherein in response to determining that said write queue is not empty, said memory interface is capable of writing data in said write queue to said main memory.

20. A memory controller as claimed in claim 19 wherein said memory interface in response to determining that said write queue is empty, is capable of determining whether there is a pending pre-fetch request in said plurality of pre-fetch queues; and wherein said memory interface in response to determining that there is a pending pre-fetch request, is capable of determining whether there is a pre-fetch request located in a currently opened page of said main memory.

21. A memory controller as claimed in claim 20 wherein said memory interface in response to determining that there is a pre-fetch request located in a currently opened page of said main memory, is capable of accessing said main memory to obtain data to send to a matched pre-fetch queue; and wherein said memory interface in response to determining that there is no pre-fetch request located in a currently opened page of said main memory, is capable of randomly selecting a pre-fetch queue and accessing said main memory to obtain data to send to said randomly selected pre-fetch queue.

22. A method for providing a memory controller in a computer system comprising a plurality of master agents, said method comprising:

providing a bus interface that is capable of being coupled to an internal bus;

providing a memory interface that is capable of being coupled to a main memory;

providing a plurality of pre-fetch queues, wherein each pre-fetch queue is coupled to said bus interface to receive data from said bus interface, and wherein each pre-fetch queue is coupled to said memory interface to send data to said memory interface;

receiving a memory request at the bus interface:

when said memory request is determined to be a pre-fetch request:

selecting a pre-fetch queue of said plurality of pre-fetch queues using a selection algorithm; and sending said pre-fetch request to the selected pre-fetch queue.

23. A method as claimed in claim 22 further comprising:

assigning each of said plurality of pre-fetch queues to one master agent of said plurality of master agents of said computer system.

24. A method as claimed in claim 22 further comprising:

providing a write queue coupled to said bus interface and to said memory interface; and providing a read line coupled to said bus interface and Co said memory interface.

25. A method as claimed in claim 22 further comprising:

when said memory request is determined to be a memory read request:

determining in said bus interface whether a pre-fetch flag is set in said memory read request;

in response to determining that said pre-fetch flag is set, sending said pre-fetch request to a pre-fetch queue as a pre-fetch request.

26. A method as claimed in claim 22 further comprising:

when said memory request is determined to be a memory read request:

determining in said bus interface whether data requested by said memory read request is located in a pre-fetch queue of said plurality of pre-fetch queues; and in response to determining that said requested data is located in said pre-fetch queue, retrieving said requested data from said pre-fetch queue.

27. A method as claimed in claim 26 further comprising:

in response to determining that said requested data is not located in said pre-fetch queue, sending said memory read request to said memory interface; and retrieving said requested data into said memory interface from said main memory.

28. A method as claimed in claim 22 further comprising:

when said memory request is determined to be a pre-fetch request:

sending said pre-fetch request from said selected pre-fetch queue to said memory interface;

retrieving in said memory interface from said main memory data requested by said pre-fetch request; and sending said data from said memory interface to said selected pre-fetch queue that requested said data.

29. A method as claimed in claim 22 wherein said selection algorithm comprises:

selecting a pre-fetch queue that contains requested data from said plurality of pre-fetch queues;

selecting an empty pre-fetch queue if none of said plurality of pre-fetch queues contains said requested data;

selecting a pre-fetch queue that has gone the longest time without being accessed if there are no empty pre-fetch queues; and discarding data from a pre-fetch queue that is selected.

30. A method as claimed in claim 22 further comprising:

determining in said bus interface that said memory request is a memory write request;

sending said memory write request from said bus interface to a write queue;

sending said memory write request from said write queue to said memory interface; and sending said write request from said memory interface to said main memory.

31. A method as claimed in claim 22 further comprising:

dynamically assigning one of said plurality of pre-fetch queues to one of a plurality of master agents of said computer system when a number of master agents of said computer system is greater than a number of pre-fetch queues in said memory controller.

32. A method as claimed in claim 31 further comprising:

providing a write queue coupled to said bus interface and to said memory interface; and providing a read line coupled to said bus interface and to said memory interface.

33. A method as claimed in claim 32 further comprising:

receiving in said bus interface through said internal bus a memory request from a bus master associated with a master agent; and determining in said bus interface whether said memory request is one of: a memory read request and a memory write request.

34. A method as claimed in claim 33 further comprising:

determining in said bus interface whether data requested by said memory read request is located in a pre-fetch queue of said plurality of pre-fetch queues; and in response to determining that said requested data is located in said pre-fetch queue, retrieving said requested data from said pre-fetch queue.

35. A method as claimed in claim 34 further comprising:

in response to determining that said requested data is not located in said pre-fetch queue, sending said memory read request to said memory interface; and retrieving said requested data into said memory interface from said main memory.

36. A method as claimed in claim 33 further comprising:

determining in said bus interface whether a pre-fetch flag of a current memory read request is set; and in response to determining that said pre-fetch flag is set, sending said current memory read request to a current pre-fetch queue with a next address.

37. A method as claimed in claim 35 further comprising:

determining in said bus interface whether a pre-fetch flag of a current memory read request is set;

in response to determining that said pre-fetch flag is set, selecting a pre-fetch queue of said plurality of pre-fetch queues using a selection algorithm; and sending to said pre-fetch queue selected by said selection algorithm said current memory read request with a next address.

38. A method as claimed in claim 33 further comprising:

in response to determining in said memory interface that there is a memory read request on said read line, determining whether there is data in said write queue that has a same address as said memory read request.

39. A method as claimed in claim 38 further comprising:

in response to determining in said memory interface that there is data in said write queue that has a same address as said memory read request, writing said data in said write queue to said main memory; and in response to determining in said memory interface that there is no data in said write queue that has a same address as said memory read request, accessing said main memory to obtain data to complete said memory read request.

40. A method as claimed in claim 33 further comprising:

in response to determining in said memory interface that there is no memory read request on said read line, determining whether said write queue is empty; and in response to determining in said memory interface that said write queue is not empty, writing data in said write queue to said main memory.

41. A method as claimed in claim 40 further comprising:

in response to determining in said memory interface Chat said write queue is empty, determining whether there is a pending pre-fetch request in said plurality of pre-fetch queues; and in response to determining in said memory interface that there is a pending pre-fetch request, determining whether there is a pre-fetch request located in a currently opened page of said main memory.

42. A method as claimed in claim 41 further comprising:

in response to determining in said memory interface that there is a pre-fetch request located in a currently opened page of said main memory, accessing said main memory to obtain data to send to a matched pre-fetch queue; and in response to determining in said memory interface that there is no pre-fetch request located in a currently opened page of said main memory, randomly selecting a pre-fetch queue; and accessing said main memory to obtain data to send to said randomly selected pre-fetch queue.

43. A memory controller comprising:

a bus interface capable of being coupled to an internal bus of said computer system;

a memory interface capable of being coupled to a main memory of said computer system; and a plurality of pre-fetch queues, wherein each pre-fetch queue is coupled to said bus interface to receive data from said bus interface, and wherein each pre-fetch queue is coupled to said memory interface to send data to said memory interface;

wherein said bus interface, upon identifying a memory read request, is capable of determining if a pre-fetch flag is set in said memory read request, and in response to determining that said pre-fetch flag is set, is capable of sending said memory read request to a pre-fetch queue as a pre-fetch request.

* * * * *